Patented Aug. 31, 1937

2,091,565

UNITED STATES PATENT OFFICE 2,091,565

PREPARATION OF TERTIARY BUTYL PHENOL

Ralph P. Perkins and Howard S. Nutting, Midland, Mich., assignors to The Dow Chemical Company, Midland, Mich., a corporation of Michigan No Drawing. Application July 15, 1935,
Serial No. 31,444

11 Claims. (Cl. 260—154)

This invention concerns a method of preparing tertiary butyl phenol.

It is well known that an alkylated aromatic compound, such as an alkyl phenol, can be prepared by reacting the aromatic compound with an olefine corresponding to the alkyl group to be introduced into the aromatic ring in the presence of a Friedel-Crafts catalyst. For instance, in Annales de Chimie, Ser. 10, vol. 11, pages 550–556, the reaction of cyclohexene with phenol to produce cyclohexyl phenol is described. Also, in a copending application of Ralph P. Perkins, Serial No. 737,813, filed July 31, 1934, it is disclosed that a polyolefine, e. g. di-isobutylene, may be reacted with phenol in the presence of a Friedel-Crafts catalyst at a temperature below 90° C. to produce the corresponding alkylated phenol, i. e., tertiary octyl phenol, in good yield.

We have now discovered that by reacting a polyisobutylene, e. g., di-isobutylene, tri-isobutylene, etc., or mixtures thereof, with phenol at a temperature above 90° C., tertiary butyl phenol instead of tertiary octyl phenol is formed as the major product. Apparently, the types of reactions involved are illustrated by the following equations for the production of tertiary butyl phenol from di-isobutylene and phenol:

tertiary butyl phenol. The invention, then, consists in the method of making tertiary butyl phenol hereinafter fully described and particularly pointed out in the claims.

In preparing tertiary butyl phenol from di-isobutylene and phenol by our method, a mixture of said compounds is heated to a reaction temperature above 90° C., preferably between 110° and 190° C., in the presence of a Friedel-Crafts catalyst. The di-isobutylene and phenol may be employed in any desired proportions, but the reaction proceeds most satisfactorily when an excess of the phenol is employed. Likewise, the catalyst may be employed in any desired proportion, but, for the sake of economy, is preferably used in a proportion representing between about 1 per cent and about 10 per cent of the weight of the phenol. Among the various Friedel-Crafts catalysts which may be used are aluminum chloride, aluminum bromide, ferric chloride, stannic chloride, or an acid-activated bleaching earth such as tonsil, super-filtrol, etc. The reaction is usually carried out under reflux at atmospheric pressure, but may be carried out under elevated pressures in a closed reactor, if desired. The reaction is usually complete after from 1 to 3 hours of heating, but a longer heating period may sometimes be required, particularly when a mildly active catalyst such as acid-activated siliceous earth is employed.

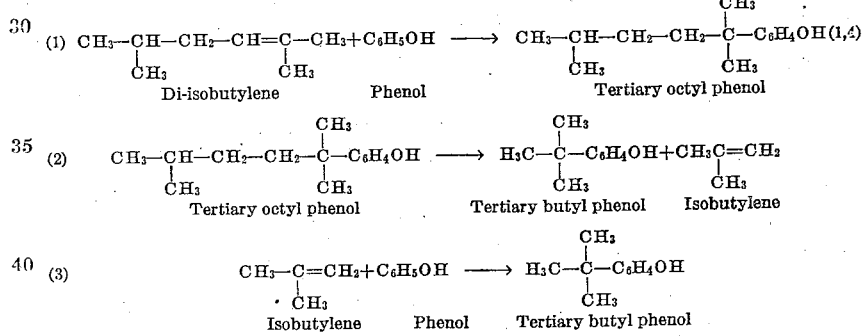

After completing the reaction, the mixture is cooled and the catalyst removed or destroyed by usual procedure, e. g., by treatment with water, an aqueous base, or an aqueous acid solution. The mixture is then distilled to separate the tertiary butyl phenol product.

This is confirmed by our further discovery that by heating tertiary octyl phenol, e. g., the product of Equation 1, with phenol under like conditions, i. e. at a temperature above 90° C. in the presence of a catalyst, tertiary butyl phenol is formed in accordance with Equations (2) and (3). There is thus afforded a method whereby di- and tri-isobutylenes, which may be produced in large quantities from by-product materials in the cracking of petroleum, may be utilized in the production of the commercially-valuable compound, Instead of preparing tertiary butyl phenol by reacting di-isobutylene with phenol as described above, the compound may be produced equally well by heating tertiary octyl phenol to a temperature above 90° C. with, preferably, one or more times its molecular equivalent of phenol, in the presence of a Friedel-Crafts catalyst. The reactions involved are set forth in Equations (2) and (3) above.

The following examples illustrate several ways in which the principle of our invention is being employed, but are not to be construed as limiting the invention.

Example 1

1410 grams (15 moles) of phenol and 45 grams of aluminum chloride were stirred together, and to this solution was added 560 grams (5 moles) of di-isobutylene, during a period of 45 minutes, the solution temperature being held between 85°–90° C. The reaction mixture was then heated to a temperature of approximately 120° C., which temperature was maintained for 2 hours. The resultant product was neutralized with aqueous sodium carbonate, filtered, and the filtrate was distilled. There was obtained 593 grams of unreacted phenol and 967 grams of para-tertiary butyl phenol, having a freezing point of 97.2° C. The yield of para-tertiary butyl phenol was 64.5 per cent of theoretical, based on the quantity of phenol reacted.

Example 2

To a mixture of 282 grams (3 moles) of phenol with 112 grams (1 mole) of di-isobutylene was added 2.8 grams of tonsil. The resultant solution was heated under reflux at temperatures between 170° and 182° C. for two hours. The mixture was then filtered and the filtrate fractionally distilled under vacuum, whereby there was obtained 128.5 grams of unreacted phenol and 170 grams of para-tertiary butyl phenol. The yield of para-tertiary butyl phenol was 69.5 per cent of theoretical, based on the phenol reacted.

Example 3

8 grams of tonsil and 168 grams of a polymerized isobutylene mixture consisting largely of di- and tri-isobutylenes were added to 376 grams of phenol. The mixture was heated under reflux at temperatures varying from 157° to 182° C. for 2.5 hours. The mixture was then filtered to remove the tonsil and the filtrate was vacuum distilled. There was obtained 165.5 grams of phenol and 248 grams of para-tertiary butyl phenol.

Example 4

To 376 grams (4 moles) of phenol was added 18.8 grams of anhydrous aluminum chloride and 206 grams (1 mole) of para-tertiary octyl phenol. This mixture was heated with agitation at 117°–123° C. for one-half hour. Thereafter the temperature was reduced to 90° C. and the reaction mixture neutralized by adding an aqueous sodium carbonate mixture containing 31 grams of sodium carbonate and 62 grams of water. The mixture was then filtered and the filtrate fractionally distilled under vacuum. There was obtained 309 grams of unreacted phenol and 169 grams (1.13 moles) of para-tertiary butyl phenol.

The reactions herein described for the production of tertiary butyl phenol may, if desired, be carried out in the presence of a relatively non-reactive diluent such as carbon bisulphide, benzene, toluene, xylene, etc., but ordinarily we prefer to carry said reactions out in the absence of solvents other than the reactants themselves.

Other modes of applying the principle of our invention may be employed instead of those explained, change being made as regards the process herein disclosed, provided the means stated by any of the following claims or the equivalent of such stated means be employed.

We therefore particularly point out and distinctly claim as our invention:

1. In a method of making tertiary butyl phenol, the step which consists in reacting phenol with a poly-isobutylene at a temperature between 110° and 190° C. in the presence of a Friedel-Crafts catalyst.

2. In a method of making tertiary butyl phenol, the step which consists in heating a mixture of phenol and di-isobutylene to a reaction temperature between 110° and 190° C. in the presence of a Friedel-Crafts catalyst in amount representing between about 1 per cent and about 10 per cent of the weight of the phenol.

3. In a method of making tertiary butyl phenol, the steps which consist in treating phenol with at least 1 per cent its weight of a Friedel-Crafts catalyst, adding di-isobutylene and heating the mixture to a reaction temperature between about 110° and about 190° C.

4. In a method of making tertiary butyl phenol, the step which consists in heating a mixture of phenol and tertiary octyl phenol to a reaction temperature between 110° and 190° C. in the presence of a catalyst in amount representing at least 1 per cent of the weight of the phenol.

5. In a method of making tertiary butyl phenol, the step which consists in reacting a polymerized isobutylene mixture with phenol at a temperature between 110° and 190° C. in the presence of a Friedel-Crafts catalyst.

6. In a method of making tertiary butyl phenol, the step which consists in reacting a poly-isobutylene with phenol in the presence of aluminum chloride at a temperature between about 110° and about 190° C.

7. In a method of making tertiary butyl phenol, the step which consists in reacting di-isobutylene with phenol in the presence of aluminum chloride at a temperature between about 110° and about 190° C.

8. In a method of making tertiary butyl phenol, the step which consists in reacting a poly-isobutylene with phenol in the presence of an acid-activated bleaching earth at a temperature between about 110° and 190° C.

9. In a method of making tertiary butyl phenol, the step which consists in reacting di-isobutylene with phenol in the presence of an acid-activated bleaching earth at a temperature between about 110° and 190° C.

10. The method which comprises reacting phenol with a poly-isobutylene at a temperature above 90° C. in the presence of a Friedel-Crafts catalyst and thereafter separating tertiary butyl phenol from the mixture.

11. The method which comprises reacting phenol with di-isobutylene at a temperature above 90° C. in the presence of aluminum chloride in amount representing between about 1 per cent and about 10 per cent of the weight of the phenol and thereafter separating tertiary butyl alcohol from the mixture.

RALPH P. PERKINS.
HOWARD S. NUTTING.